(12) United States Patent
Pizzato et al.

(10) Patent No.: US 12,410,645 B2
(45) Date of Patent: Sep. 9, 2025

(54) REMOTE SAFETY RELEASE FOR SAFETY SWITCHES AND SAFETY SWITCH COMPRISING THE RELEASE

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 153 days.

(21) Appl. No.: 17/924,387

(22) PCT Filed: May 11, 2021

(86) PCT No.: PCT/IB2021/053989
§ 371 (c)(1),
(2) Date: Nov. 10, 2022

(87) PCT Pub. No.: WO2021/229424
PCT Pub. Date: Nov. 18, 2021

(65) Prior Publication Data
US 2023/0139838 A1    May 4, 2023

(30) Foreign Application Priority Data

May 11, 2020   (IT) .......... 102020000010513

(51) Int. Cl.
*E05C 3/22*    (2006.01)
*E05B 1/00*    (2006.01)
*E05B 53/00*   (2006.01)
*E05B 63/12*   (2006.01)
*E05C 3/00*    (2006.01)
*F16P 3/08*    (2006.01)

(52) U.S. Cl.
CPC .............. *E05C 3/22* (2013.01); *E05B 1/0038* (2013.01); *E05B 53/005* (2013.01); *E05C 3/006* (2013.01); *F16P 3/08* (2013.01); *E05B 63/12* (2013.01)

(58) Field of Classification Search
CPC ........ H01H 2223/01; H01H 2231/012; H01H 2231/032; E05B 63/12; E05B 53/005; E05B 1/0038; E05B 1/00; E05B 53/00; F16P 3/08; E05C 3/006; E05C 3/22; E05C 3/00
USPC ...................................... 200/50.01
See application file for complete search history.

(56) References Cited

FOREIGN PATENT DOCUMENTS

GB         2317002 A  *  3/1998  ............ D06F 58/04

* cited by examiner

*Primary Examiner* — Anthony R Jimenez
(74) *Attorney, Agent, or Firm* — Rivka Friedman

(57) ABSTRACT

A remote safety release comprises an actuator (13) adapted to move between a inoperative position wherein it does not interact with the locking mechanism of a switch and at least one operative position wherein it interacts with the locking mechanism, a remote control device (14) adapted to promote the movement of the actuator from the inoperative position to an operative position, a transfer mechanism (15) adapted to transfer a force from the remote control device (14) to the actuator (13) following the command given by the operator to promote the movement of the actuator (13) and adapted to exert a first solicitation on the actuator (13) to promote its automatic passage from the inoperative position to an operative position, while the remote control device (14) constantly exerts on the actuator (13) a second contrast solicitation opposite to the first solicitation and having at least equal value.

13 Claims, 14 Drawing Sheets

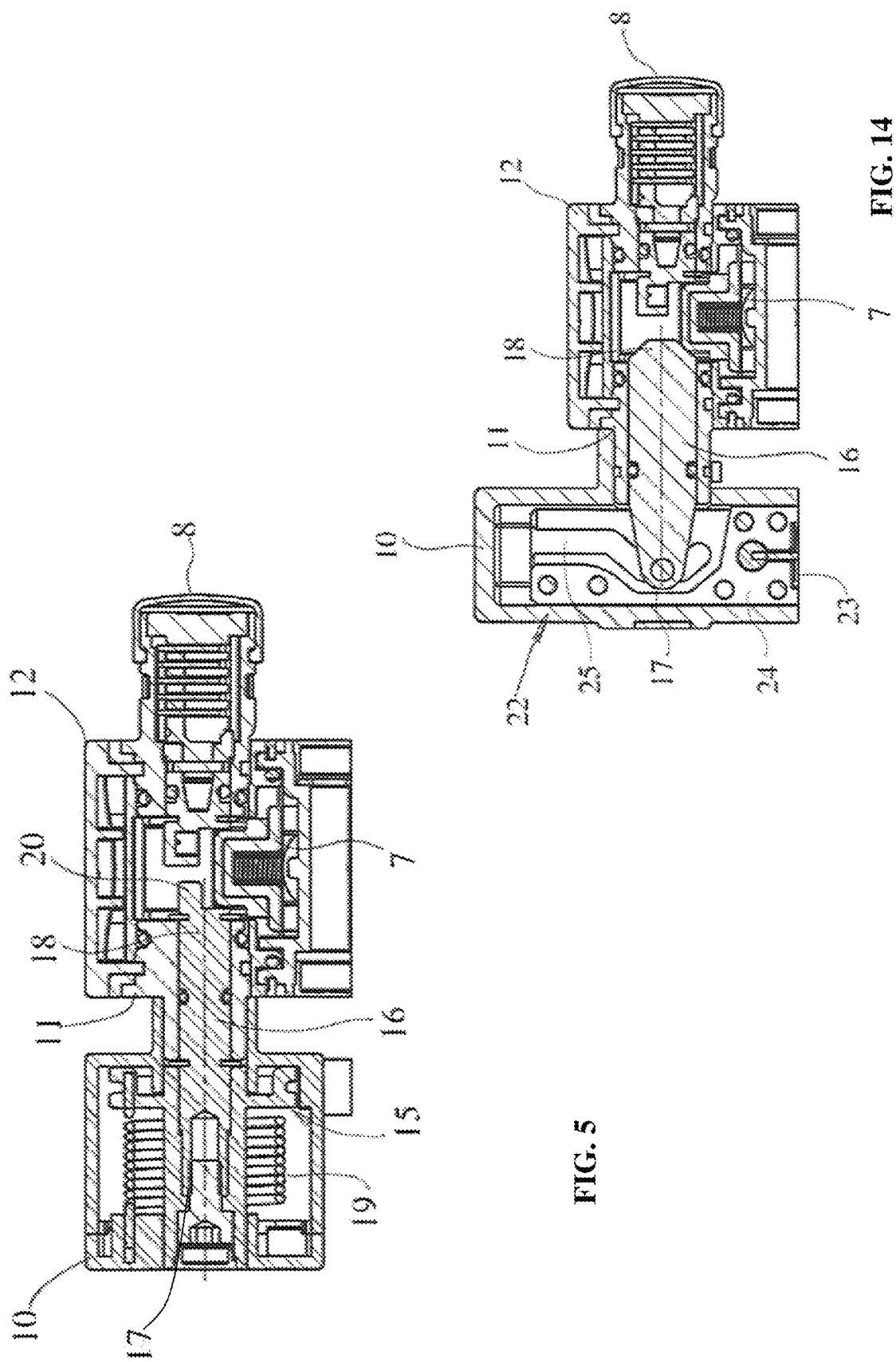

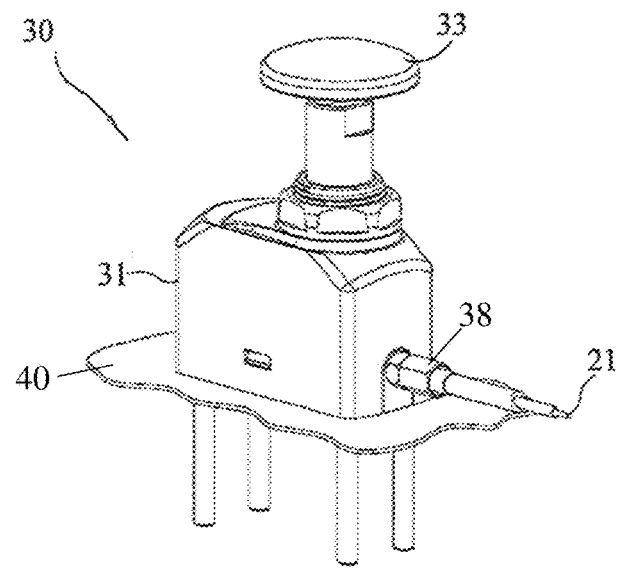
FIG. 9
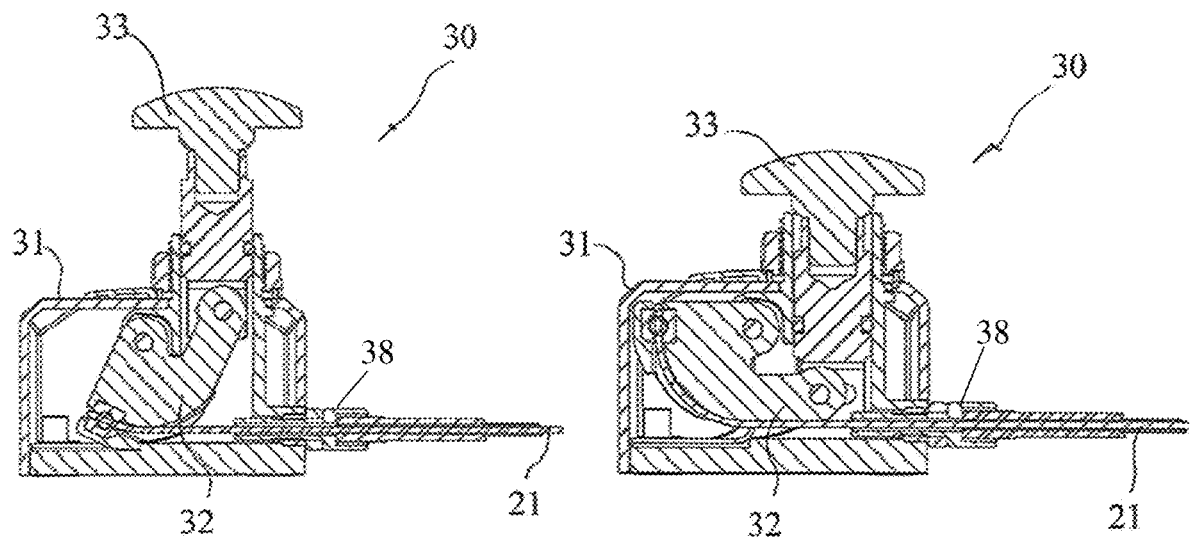
FIG. 10A
FIG. 10B

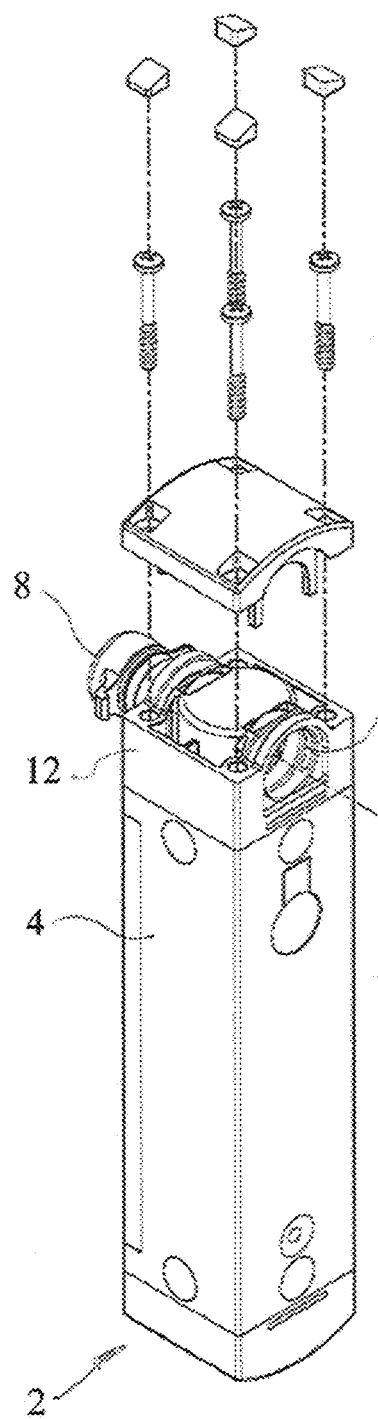
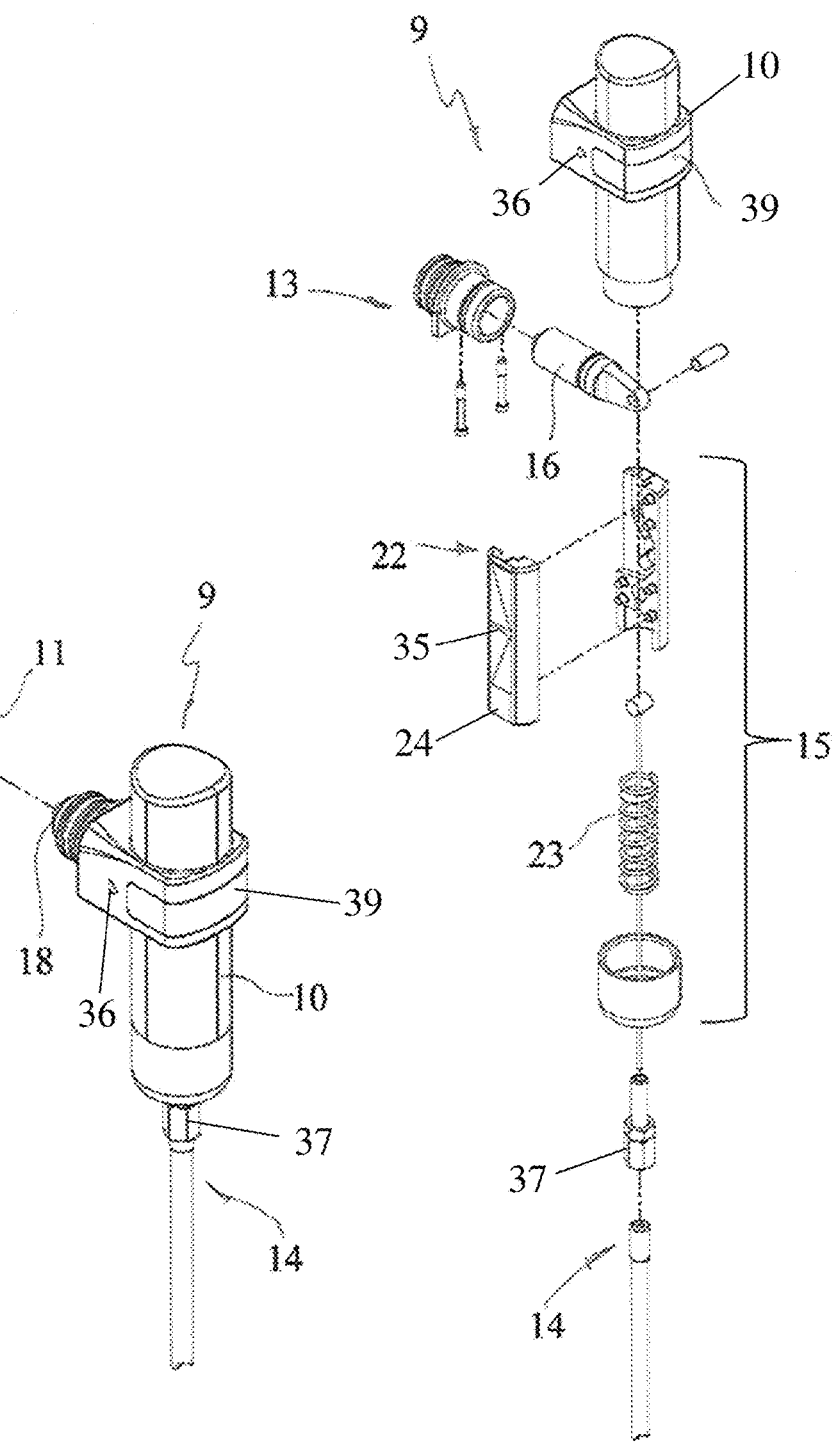
FIG. 12
FIG. 13

REMOTE SAFETY RELEASE FOR SAFETY SWITCHES AND SAFETY SWITCH COMPRISING THE RELEASE

TECHNICAL FIELD

The present invention finds application in the field of electrical devices for industrial use and has particularly as its object a remote safety release adapted to be applied to a safety switch, in particular of the type designed for the protection of movable protections, such as barriers, guards, service panels or similar, for the control of access to industrial machines and plants, which remote release allows an operator to release the switch even remotely.

STATE OF THE ART

Known switches for controlling access to barriers and/or security perimeters for industrial machines or plants generally comprise a switching device anchored to the fixed part of the access and an actuator device anchored to the movable part.

These switches have the purpose of blocking the system when the access is opened for obvious safety reasons, activating at the same time one or more signalling or service circuits, also keeping access blocked if the system is not in a safe condition.

Similarly, the switches can allow the immediate restart of the machine or system when access is closed, unless conditions have occurred that require the specific intervention of an operator.

The command of the switching means for opening and closing the power supply circuit of the machine or system may be carried out either by means of a mechanical or electronic type actuator.

In the first case, a key actuator is usually associated with the movable device and adapted to fit into a slot of the switching device to interact with a mechanism for actuating the switching means for opening/closing the power supply circuit and any auxiliary circuits.

At the same time, the key actuator is engaged by a locking slider controlled by a proper locking/unlocking mechanism, whose function is to hold the actuator inside the slot to prevent access from being opened in unsafe conditions and also prevent the same actuator from escaping as a result of vibrations transmitted by the access.

The electronically operated switches, as described for example in application WO2015083143 in the name of the same Applicant, provide that the two devices are provided with respective electronic circuits adapted to interact with each other by a presence signal sent by the circuit associated with the actuator device so as to allow opening or closing of the main power supply circuit according to their mutual distance. Generally, also for this second type of switch, the movable actuator device is provided with a centering and holding element adapted to be inserted in a suitable hole of the fixed switching device, inside which there is the locking/unlocking mechanism with a slider that will engage the centering pin to prevent its unauthorized extraction.

Regardless of the specific configuration of the switch, the release of the holding element, be it the actuator itself or the above centering and holding element, can be produced by a special electric command sent to the control mechanism of the element or given by means of an auxiliary mechanical emergency release command placed directly on the housing of the switching device and adapted to act directly on the holding element.

Some switches can also be equipped with an additional remotely operated emergency release device.

This solution is generally adopted in those cases where it is not possible, or unwilling, to arrange the switch in a position that is easily accessible by the operators.

The remote release devices generally comprise a housing integrated or adapted to be applied to the casing of the switching device and inside which there is an auxiliary actuator adapted to interact with the locking/unlocking mechanism to remove the locking of the holding element following a command given remotely via an actuator.

An example of a safety switch with remote release device is described in DE102006020500, wherein the remote activation of the auxiliary release device is carried out by pulling a Bowden cable.

A drawback common to the known solutions is represented by the fact that these known release devices do not have systems which allow immediate release of the holding mechanism in the event of damage or malfunction of the remote control, for example the traction cable.

As a consequence, the malfunction of the remote control becomes the cause of a potentially dangerous situation, making the corresponding switch potentially unsafe.

SCOPE OF THE INVENTION

The object of the present invention is to overcome the above drawbacks by providing a remote safety release which can be applied to a safety switch and which has features of high efficiency and relative cost-effectiveness.

A particular purpose object is to provide a remote safety release adapted to be applied to a safety switch and which is designed to automatically operate on the locking/unlocking mechanism of the switch to which it is associated in the event of damage or malfunction of its actuator system in order to move the switch in a safe condition.

Still another particular object is to provide a remote safety release adapted to be applied to a safety switch and whose damage or malfunction cannot represent a dangerous condition for the system to which the switch is applied.

These objects, as well as others which will become more apparent hereinafter, are achieved by a remote safety release adapted to be applied to a safety switch and which, according to claim 1, comprises an actuator adapted to interact with the mechanical locking mechanism of the associated switch to cause its forced release, said actuator being adapted to move between a non-operating position wherein it does not interact with the locking mechanism and at least one operating position wherein it interacts with the locking mechanism, a remote control device adapted to be driven by an operator to remotely control said actuator and promote its movement from said non-operative position to an operative position for its interaction with the locking mechanism and the consequent release thereof, a transfer mechanism adapted to transfer a force from said control device to said actuator following the command given by the operator for promoting the movement of said actuator from the inoperative position to at least one operative position.

According to a peculiar features of the invention, the transfer mechanism is adapted to exert a first solicitation on said actuator such as to promote its automatic passage from said inoperative position to an operative position, said remote control device being designed to constantly exert on said actuator, in the absence of the remote control, a second contrasting solicitation opposite to said first solicitation and having a value at least equal to cancel said first solicitation and keep said actuator in said inoperative position, allowing the automatic passage of said actuator from the non-operating position operative to an operative position in the absence of said second solicitation for the release of the locking mechanism.

Thanks to this combination of features, if there is a break, damage or malfunction of the control device that can be operated remotely, the contrast solicitation that keeps the actuator in a non-operating position, i.e. not interacting with the locking mechanism, will become null.

Consequently, the transfer mechanism, due to the solicitation that it constantly exerts on the actuator, will automatically cause it to move into an operating position, that is, in a position in which it interacts with the locking mechanism, so as to cause its release. The block will thus be removed, resulting in a contextual or timed shutdown of the plant, or of its dangerous parts, and simultaneous release of access, in order to bring the system in safe conditions.

According to a further aspect of the invention, a safety switch is provided in accordance with claim 9.

Advantageous embodiments of the invention are obtained in accordance with the dependent claims.

BRIEF DISCLOSURE OF THE DRAWINGS

Further features and advantages of the invention will become more evident in the light of the detailed description of some preferred but not exclusive embodiments of the remote safety release and of a safety switch comprising the release, illustrated by way of non-limiting example with the aid of the attached drawing tables wherein:

FIG. 5 is a sectional side view of the safety release of FIG. 4 applied to the switch and in an inoperative condition;

Figure 4:
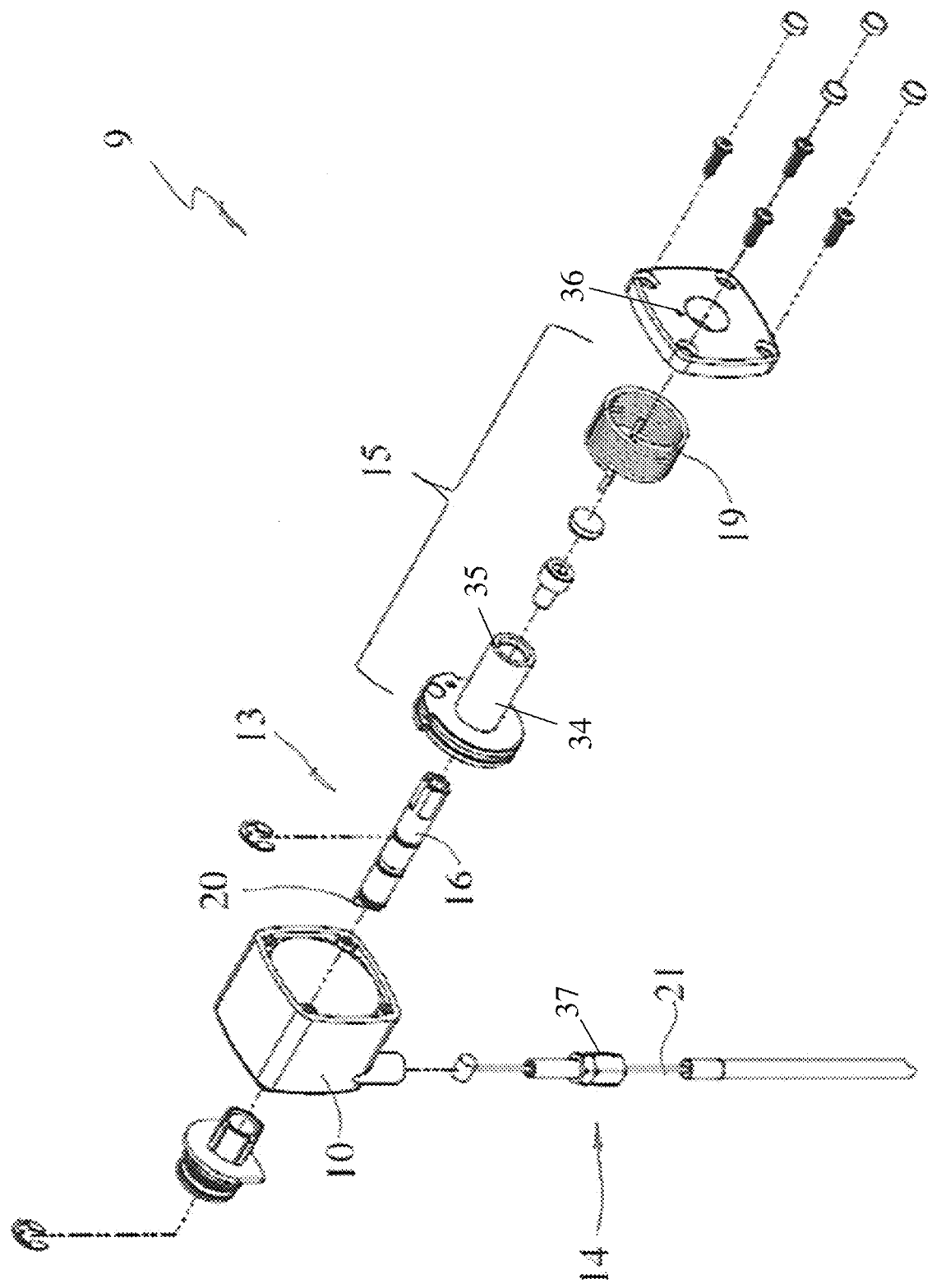
FIG. 4 is an exploded perspective view of the safety release according to the first preferred embodiment.
Figure 6A:
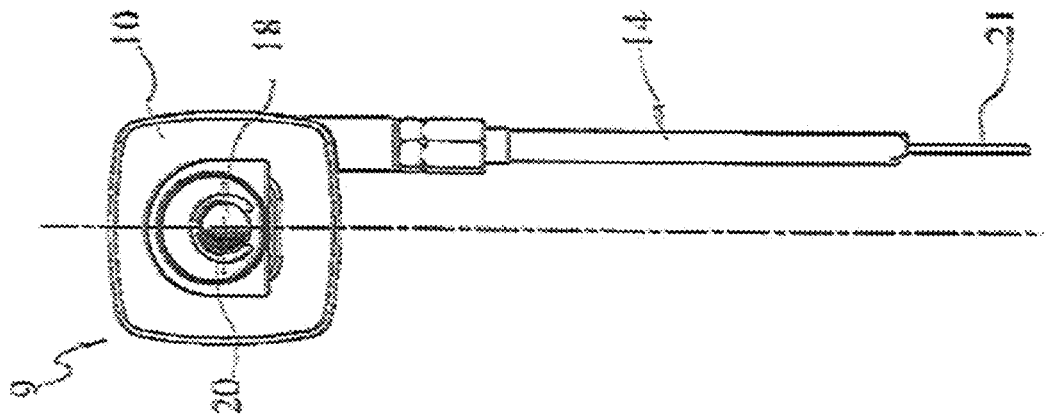
Figure 6B:
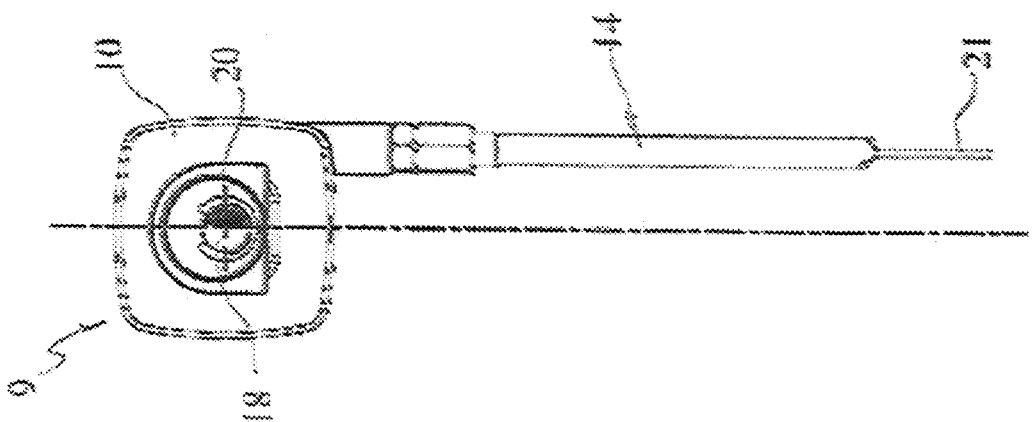
Figure 6C:
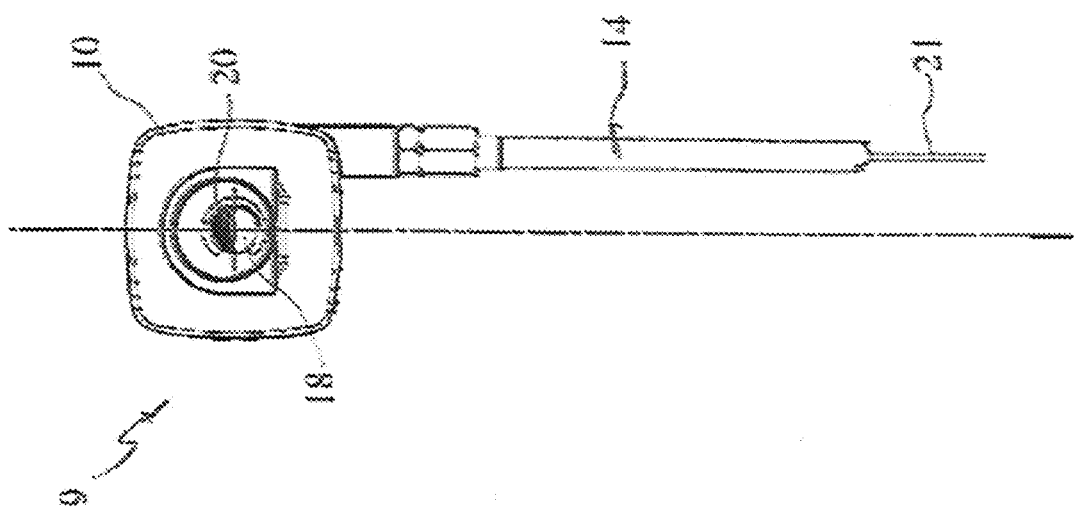
Figure 7C:
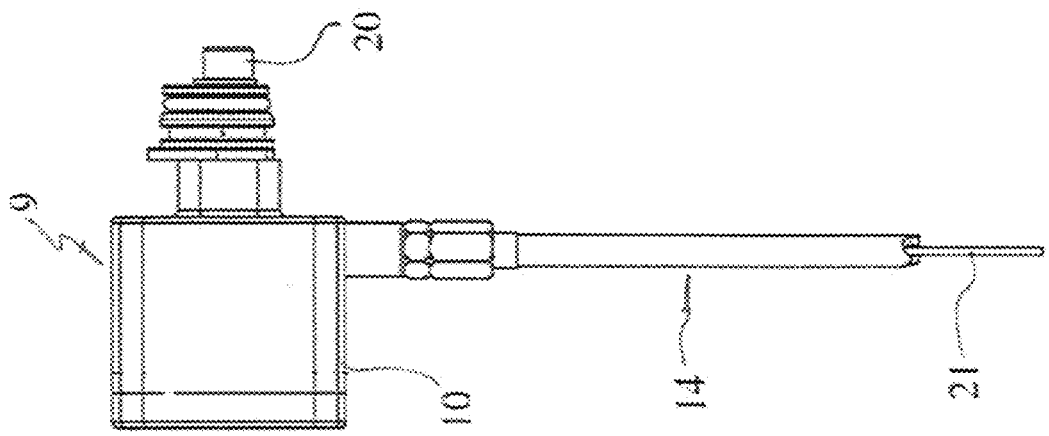
Figure 7B:
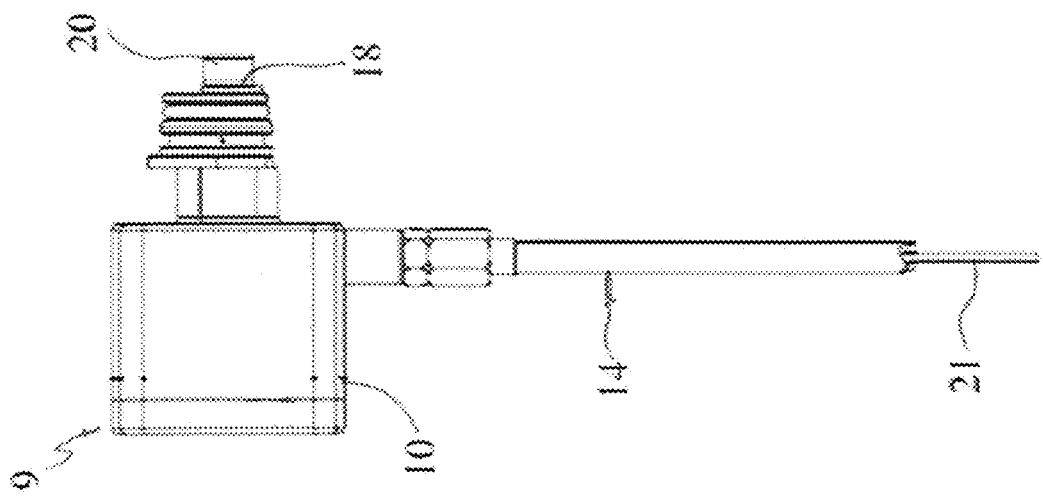
Figure 7A:
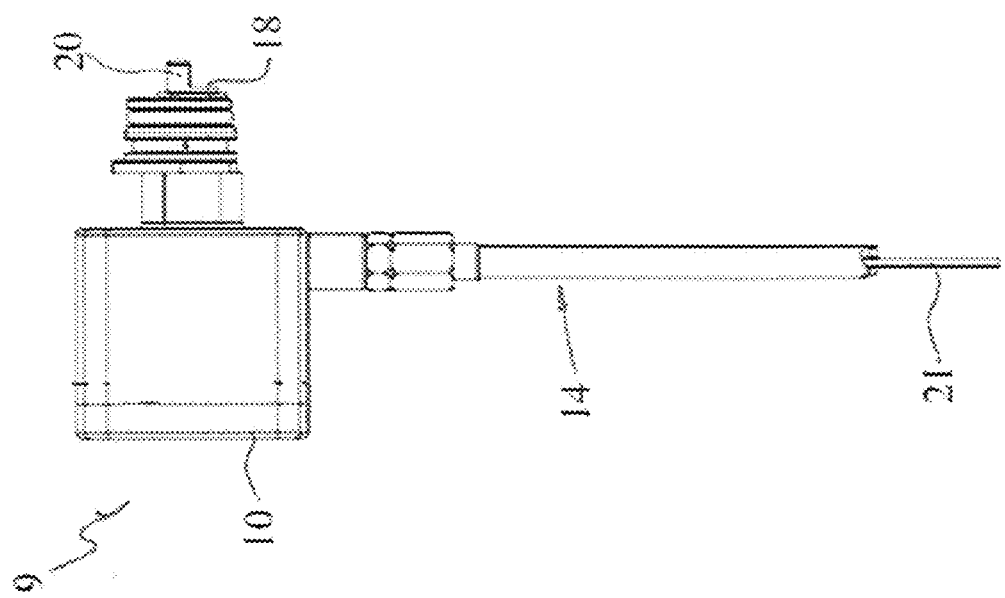
Figure 8C:
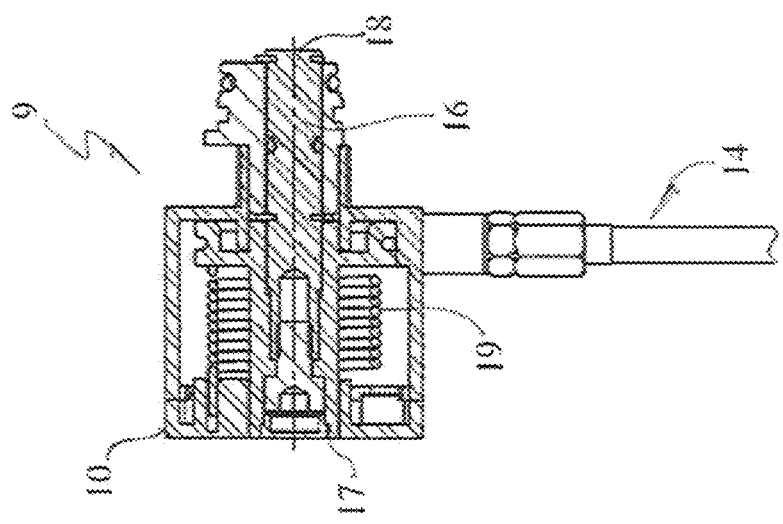
Figure 8B:
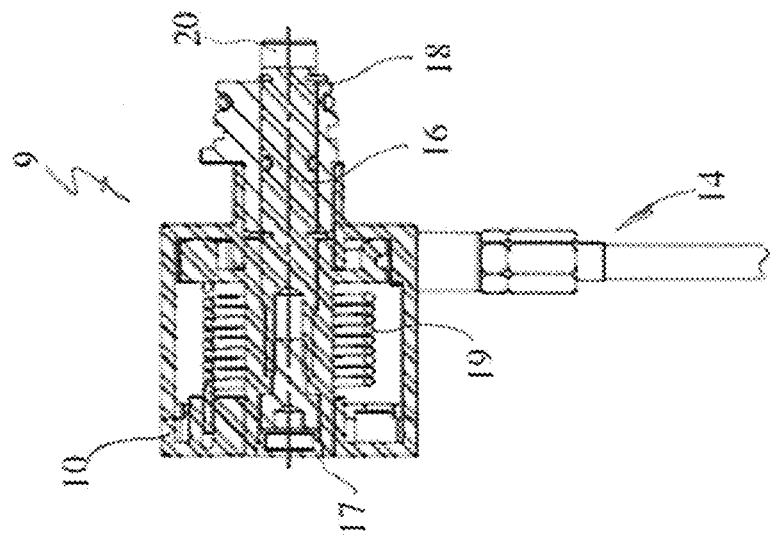
Figure 8A:
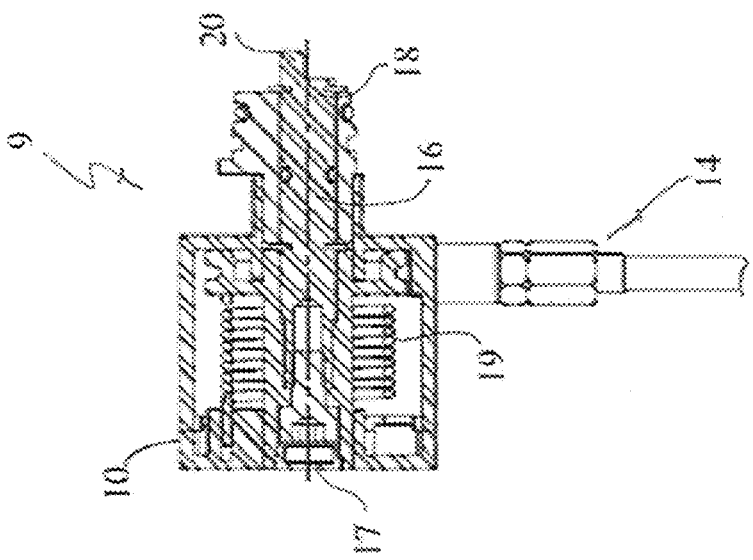
Figure 11C:
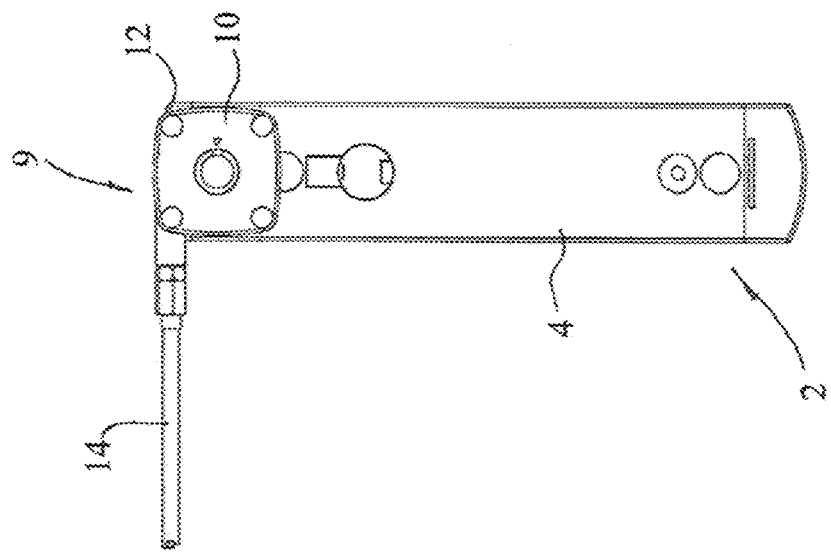
Figure 11B:
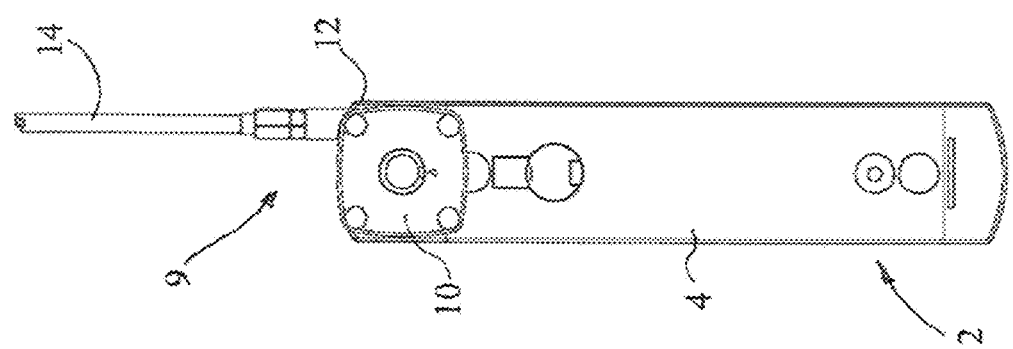
Figure 11A:
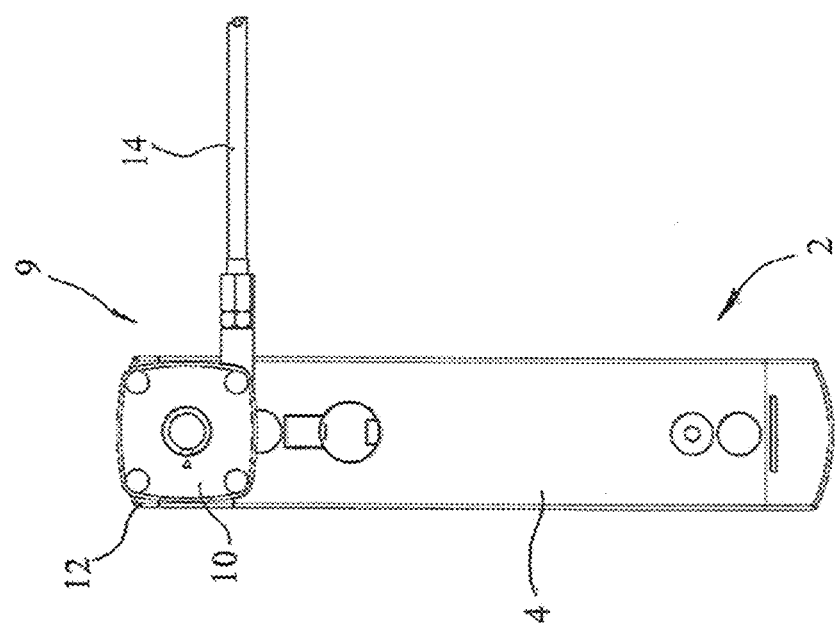
Figure 15C:
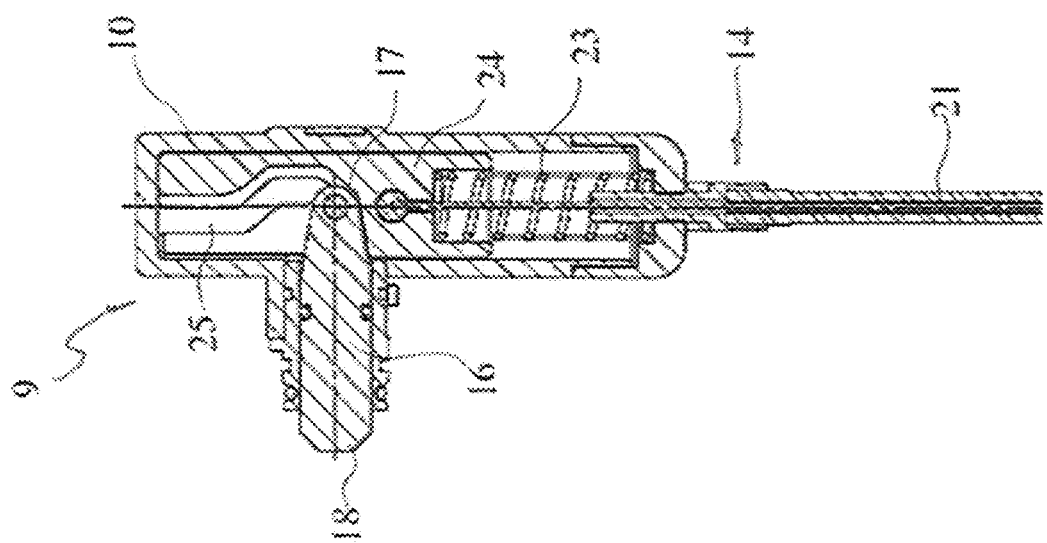
Figure 15B:
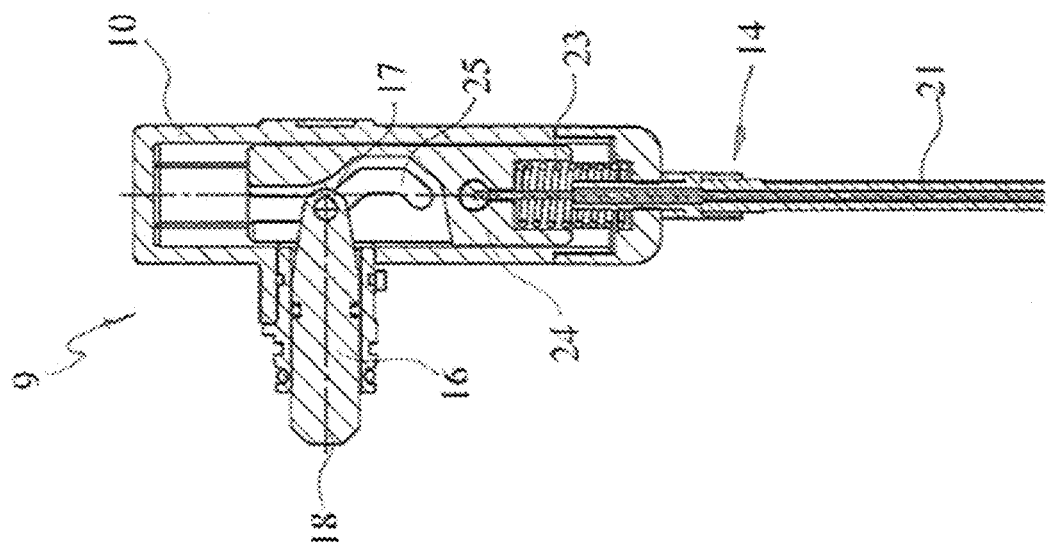
Figure 15A:
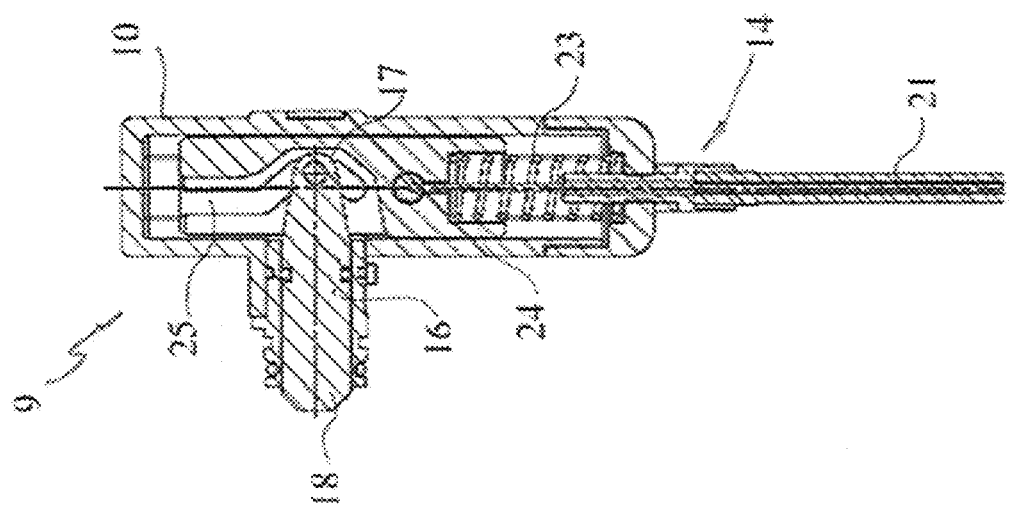
Figures 16, 17:
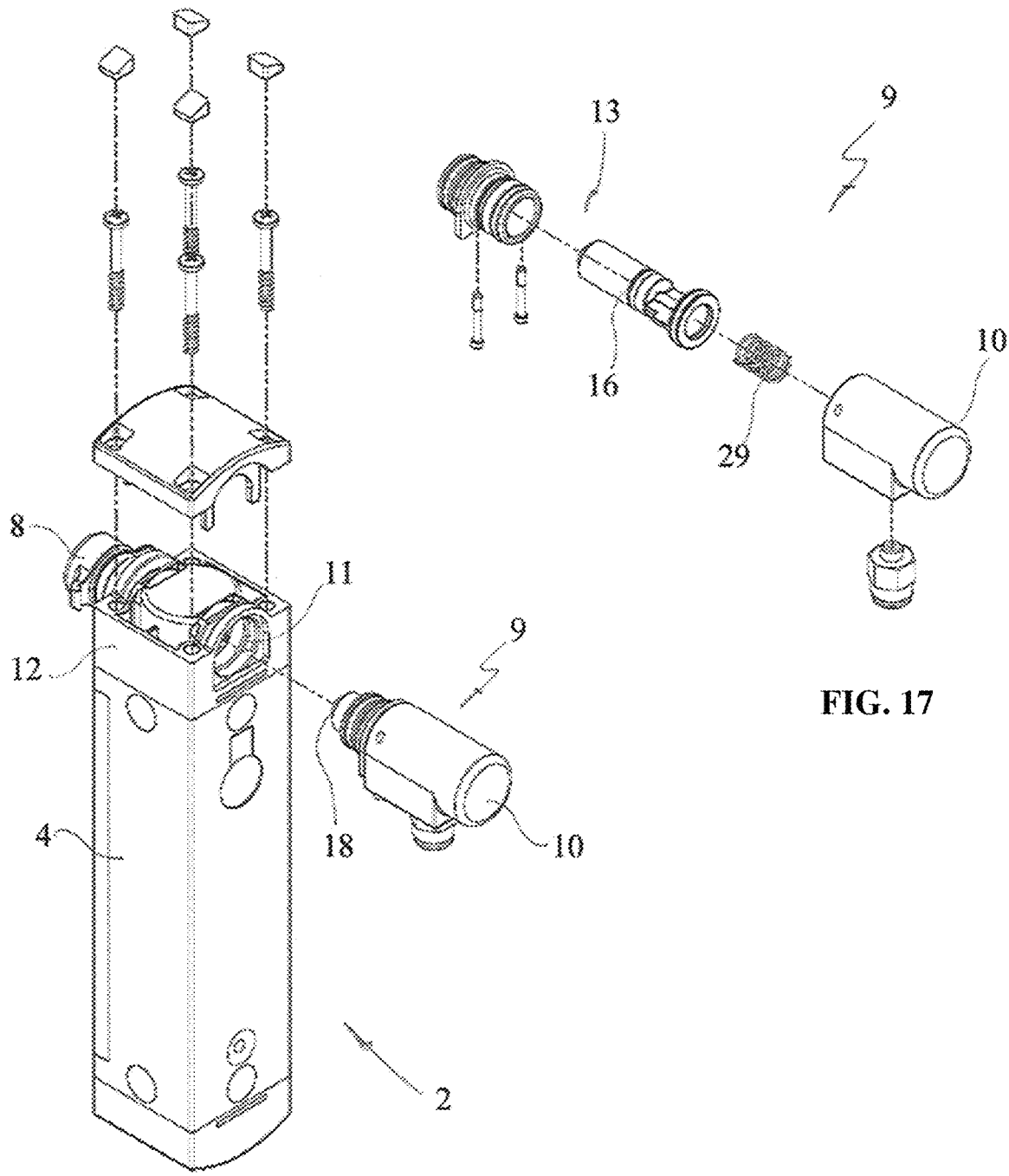
Figure 18A:
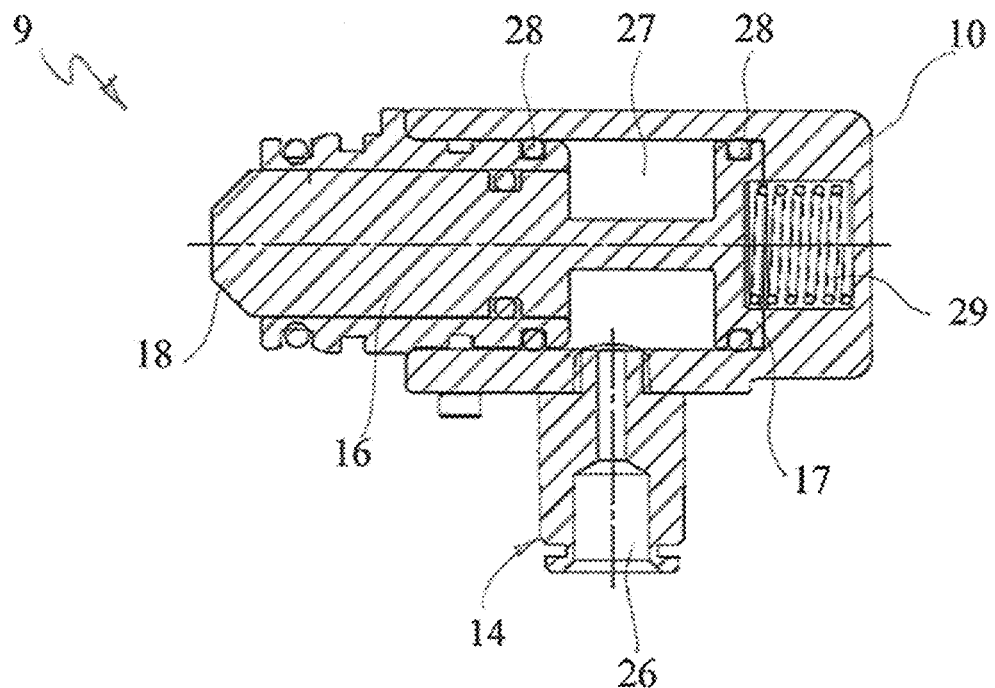
Figure 18B:
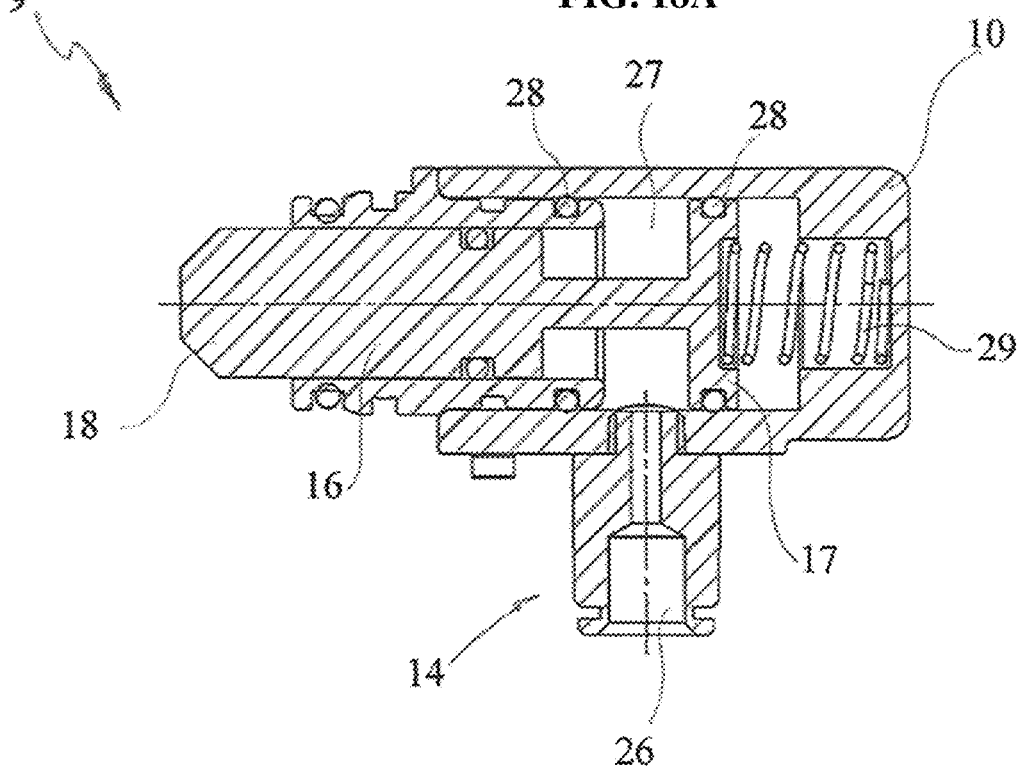

FIGS. 6A, 6B, and 6C are rear views of the safety release of FIG. 4 in three distinct operating conditions;

FIGS. 7A, 7B, and 7C are side views of the safety release of FIG. 4 in three distinct operating conditions;

FIGS. 8A, 8B, and 8C are sectional side views of the safety release of FIG. 4 in three distinct operating conditions;

FIG. 9 is a perspective view of a driving element of a safety release according to FIG. 4 in one of two distinct operating conditions;

FIG. 10A is a sectional view of the detail of FIG. 9;

FIG. 10B is a sectional view showing the driving element in the other of the two distinct operating conditions;

FIGS. 11A, 11B, and 11C are rear views of the safety release of FIG. 4 rotated according to three configurations;

FIG. 12 is a partially exploded perspective view of the switch associated with a safety release in a second preferred embodiment;

FIG. 13 is an exploded perspective view of the safety release of FIG. 12;

FIG. 14 is a sectional side view of the safety release of FIG. 12 applied to the switch and in an inoperative condition;

FIGS. 15A and 15B are sectional side views of the safety release of FIG. 12 in three distinct operative conditions;

FIG. 16 is a partially exploded perspective view of the switch associated with a safety release in a third preferred embodiment;

FIG. 17 is an exploded perspective view of the safety release of FIG. 16;

FIGS. 18A and 18B are sectional side views of the safety release of FIG. 16 in two distinct operative conditions.

BEST MODES OF CARRYING OUT THE INVENTION

With reference to the attached figures, a preferred but not exclusive embodiment of a safety switch for controlling access to industrial machines or plants and associated with a remote safety release according to some preferred but not exclusive embodiments is shown.

The switch will generally be designed to be applied, preferably but not exclusively, to a barrier or movable protection panel designed to prevent unsafe access to a machine or industrial plant during operation.

Typically, the switch will be designed to be applied to the protection at an access thereof to interrupt the operation of the machine or plant in a substantially immediate or timed manner in case of the opening of a door or panel closing this access.

Figures 1A, 1B:
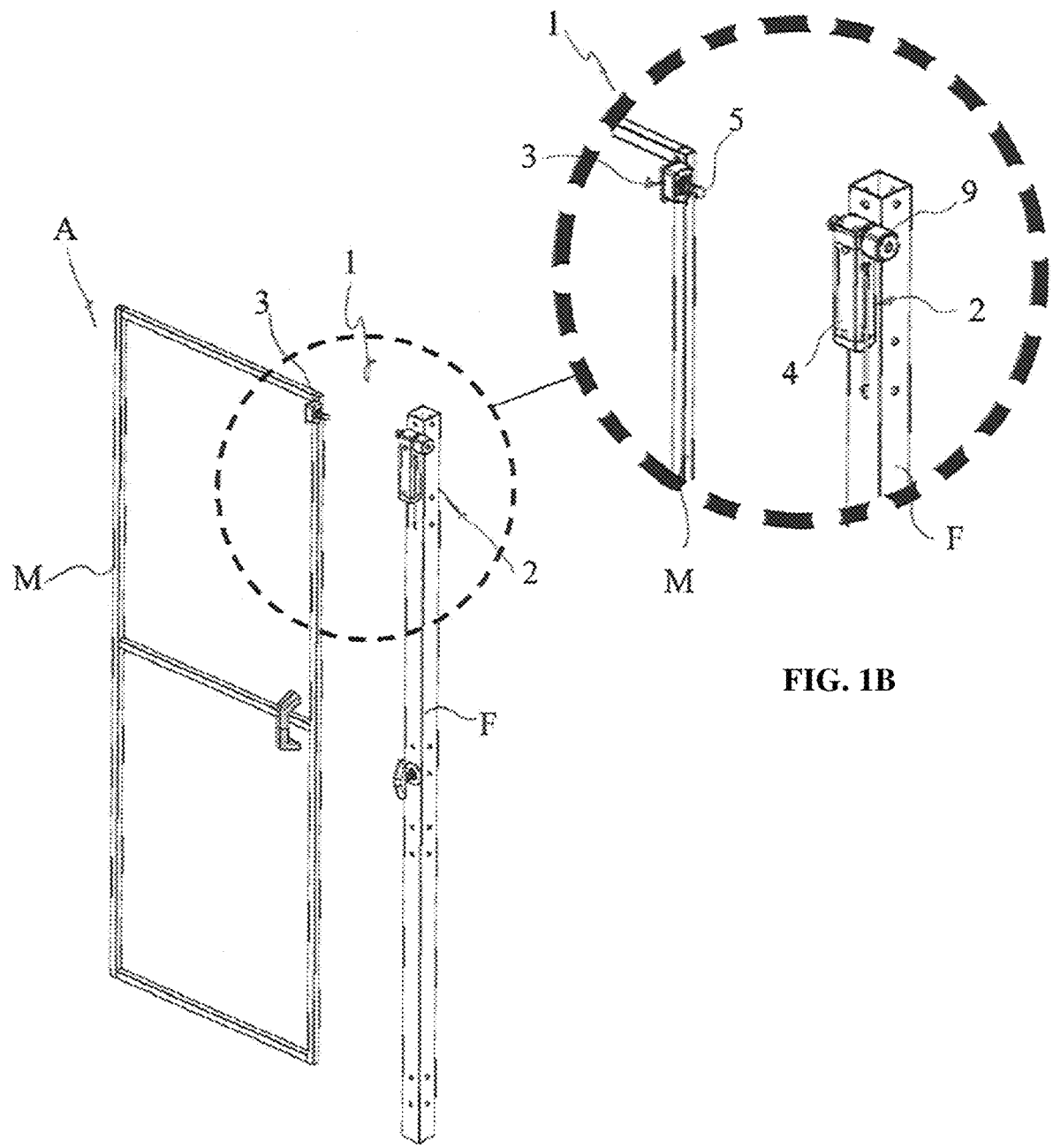
FIG. 1A is a perspective view of the switch provided with a safety release in a first preferred embodiment and wherein the switch is applied to an access of a safety perimeter in an open access condition.
FIG. 1B is an enlarged view of a detail of FIG. 1A.

FIGS. 1A and 1B show a typical application wherein a switch, globally referred with 1, is applied to an access A of a protection barrier.

The switch 1 comprises a switching device 2 adapted to be fixed to the fixed frame F of the access A and connected in a known manner to one or more electric and/or electronic circuits for powering and/or controlling the main circuit and/or service and emergency circuits, not illustrated.

The methods for connecting the switching device 2 to these circuits are of a known type and do not form part of the present invention, therefore they will not be disclosed in more detail hereinafter.

Instead, on the movable part M of the access A there is mounted an actuator device 3 adapted to interact with the switching device 2 following the opening or closing of access A to determine the opening or closing of one or more circuits according to typical modes of such safety switches.

The switching device 2 comprises a casing 4 adapted to be anchored to the fixed part F of the access A to be controlled and housing the switching means for the control of one or more control and/or service circuits of the machine or plant.

The switching means, not visible from the figures as they are internal to the casing 4, may be selected from those commonly used in the field and may also vary depending on the functionality of the switch, without particular limitations.

Inside the casing 4 there will also be driving means, not shown, suitable for interacting with the switching means upon opening/closing of the access A for opening/closing one or more circuits of the machine or plant following the interaction between the switching device 2 and the actuator device 3, also in this case according to known techniques.

An example of such a switch is disclosed in WO2017208124 or in WO2015083143, both in the name of the same Applicant, and provides that the actuator device 3 is provided with a retaining and centering element 5 which extends from the actuator device 3 to engage, upon closure of the access A, a centering hole 6 made in the casing 4.

Inside the switching device 2 there is also a locking mechanism provided with a sliding pin, not shown, which will engage the retaining element 5 to lock it by mechanical interference and prevent it from being extracted even only partially when the plant is in an unsafe condition.

The technical features of the locking mechanism are not described in more detail below as they are not significant for the present invention.

The switch 1 may also be provided with an auxiliary release command placed directly on the casing, such as the key release 8 of the figures, to manually unlock the locking mechanism.

The switch 1 illustrated in the figures is of the electronically operated type, i.e. the action of the actuator device 3 on the switching means will be controlled by an electronic signal transmitted to the switching means according to known methods and described, for example, in the above cited WO2015083143.

To this end, the switching device 2 may comprise a receiver element, for example an antenna of the RFID type housed inside the same casing 4 in a proper seat suitably arranged and designed to receive a remote control signal, or a presence signal, transmitted by a transmitter or transponder element housed in the movable actuator device 3, when the latter is at a predetermined minimum distance from the switching device 2 such that the access A can be considered closed in safe conditions.

In particular, the transponder, not visible from the figures, will be provided with a tag with an identification code that must be recognized by the antenna to allow the machine or plant to start.

The recognition of the code can be unique or generic, depending on whether you want to make a switch with a high or low level of coding.

However, according to an embodiment not shown, the switch 1 may also be electromechanically operated, i.e. with the actuator device 3 which will be provided with a mechanical actuator, for example a key, which will be inserted inside a suitable slot to interact mechanically with the switching means and at the same time engaging the sliding pin of the locking mechanism.

Figure 2:
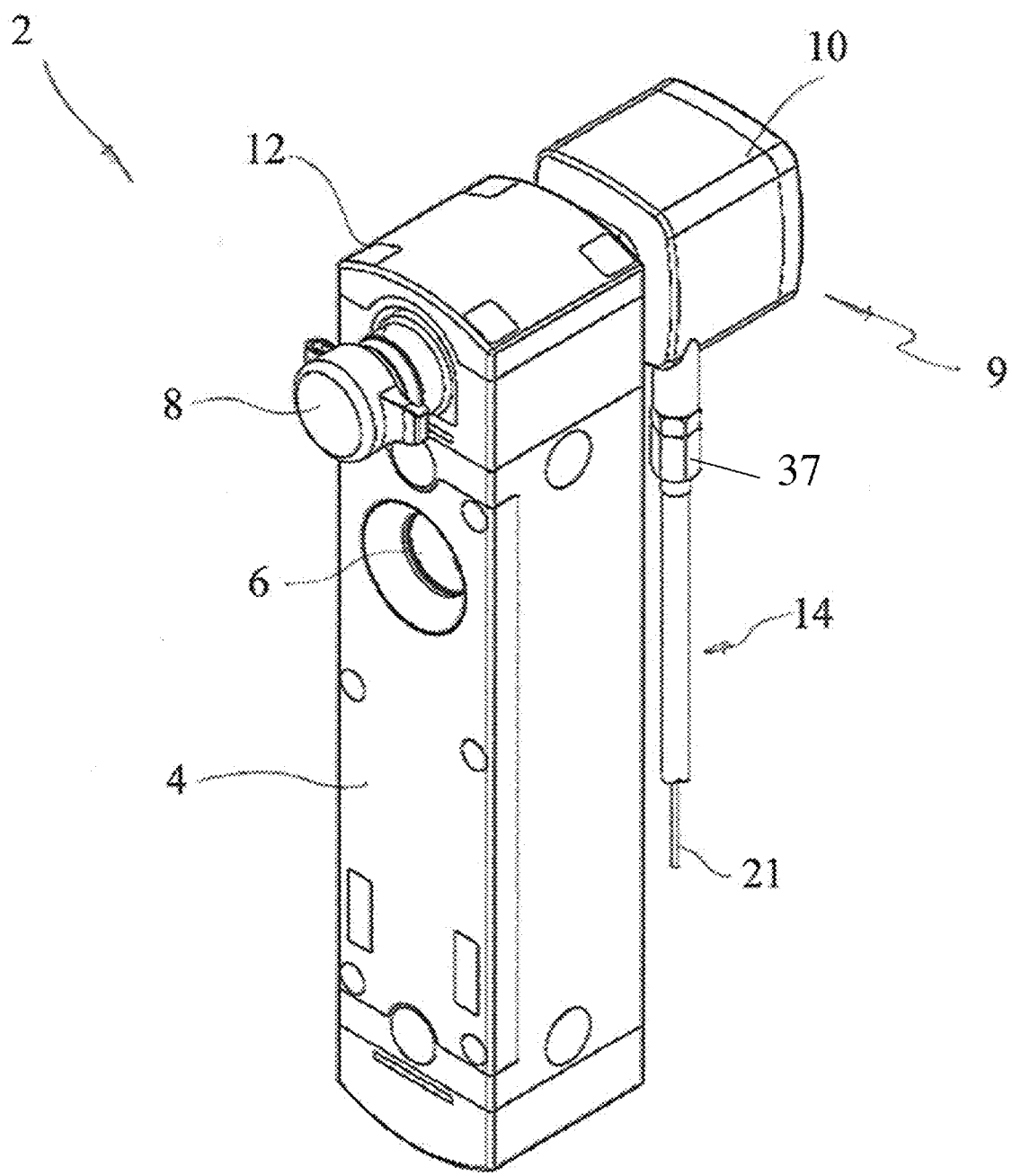
FIG. 2 is a perspective view of a part of the switch of FIG. 1A.
Figure 3:
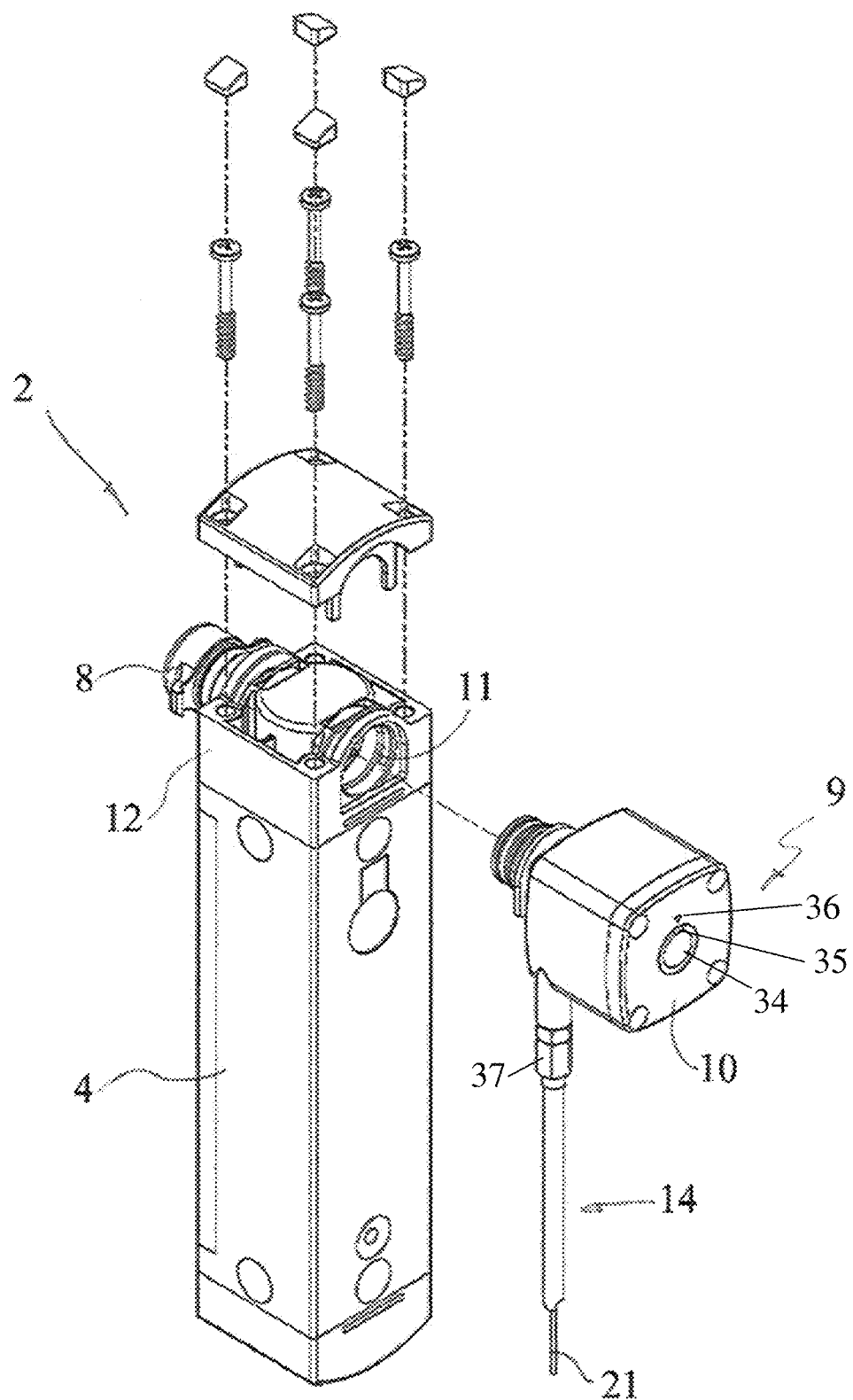
FIG. 3 is a perspective view of the part of the switch of FIG. 1A wherein the safety release is not assembled.

FIGS. 2 and 3 show the switching device 2 belonging to an electronically operated switch 1 and associated with a remote safety release 9 according to a first embodiment.

In particular, the remote safety release 9 comprises a housing 10 adapted to be anchored in a fixed but possibly removable manner to the casing 4 of the switching device 2 in correspondence with a suitable passage 11 provided in its upper head 12 in such a position as to allow the direct access to the locking mechanism and its interaction therewith in order to operate directly or indirectly on the release pin of the retaining element 5.

In the illustrated embodiment, the safety release 9 will operate against the upper end of a locking slider 7 made integral or connected to the sliding pin which locks the retaining element 5, preferably rigidly, so that upon translation of the slider 7, a translation of the holding element 5 will occur.

The release 9 comprises a movable actuator 13 arranged in the housing 10 to interact with the mechanical locking mechanism of the switch and cause its forced release.

In particular, the actuator 13 will be adapted to move between an inoperative position wherein it does not interact with the slider 7 of the locking mechanism and an operating position wherein it interacts with the slider 7 of the locking mechanism.

The safety release 9 is also provided with a remote control device 14 which can be operated by an operator to remotely control the actuator 13 and promote its movement between the above positions for its consequent interaction with the slider 7 of the locking mechanism and the consequent release thereof, as described more clearly below.

The connection between the actuator 13 and the remote control device 14 will be obtained by means of a suitable transfer mechanism 15 located in the housing 10 and which will be designed to transfer a force from the remote control device 14 to the actuator 13 following the command given by the operator, so as to promote the movement of the actuator 13.

Furthermore, the transfer mechanism 15 will be connected to the actuator 13 to exert a first solicitation thereon suitable to promote the automatic passage from the inoperative position to an operative position.

At the same time, the remote control device 14 will be designed to constantly exert on the actuator 13, in the absence of the remote control, a second contrast solicitation opposite to the first solicitation and having a value at least equal thereto to make it null and thus maintain the actuator 13 in the inoperative position.

As can be seen from the exploded view of FIG. 4 and from the section of FIG. 5, the actuator 13 comprises a release pin 16 movable in the housing 10 and having a first end 17 connected to the transfer mechanism 15 and a second end 18 adapted to project externally from the housing 10 to fit into the head 12 of the switching device 2, through the appropriate passage 11, and interact with the slider 7 of the locking mechanism.

In this configuration, the movable pin 16 will be rotatably mounted in the housing 10 to rotate around its central axis.

In turn, the transfer mechanism 15 comprises a preloaded elastic element 19 defined by a spring coiled around the pin 16 and preloaded with a first solicitation to constantly exert this first solicitation on the movable release pin 16, in a direct or indirect manner. The second end 18 of the latter will be suitably shaped with an axial projection 20 adapted to interact with the slider 7 of the locking mechanism following the rotation of the release pin 16 in any direction, while its configuration will be such that when the release pin 16 is in the inoperative position, it will be spaced from the slider 7.

The operation of the safety release 9 will appear more clearly from the comparison of FIGS. 6A, 6B, and 6C, FIGS. 7A, 7B, and 7C, and FIGS. 8A, 8B, and 8C, wherein the release 9 is shown, from left to right, respectively in the condition in which the release pin 16 is not activated and is therefore in the inoperative position, in the condition in which the release pin 16 is operated by means of the remote control device 14, and is therefore in a first operating position, and finally in the condition in which the remote control device 14 no longer exerts the contrast solicitation, for example due to breakage or malfunction, with the consequence that the pin release device 16 will be moved to a further operative position by means of the elastic element 19.

In the illustrated embodiment, the remote control device 14 comprises a traction element 21, such as a rope, cable or similar, having one end connected to the transfer mechanism 15 and the opposite end adapted to be fixed to a driving element 30, such as a knob, a mushroom or other element, anchored to a fixed support.

An example of mushroom-shaped driving element 30 is shown in FIG. 9 wherein it is shown in the non-actuated condition.

In FIGS. 10A and 10B it is instead possible to observe the mushroom-shaped driving element 30 in the two conditions not activated (FIG. 10A), and activated (FIG. 10B).

According to this configuration, the driving element 30 comprises a box-like body 31 adapted to be applied to a fixed support 40 and which houses a bistable lever 32 connected to one end of the traction element 21.

The movement of the lever system 32 and the consequent traction of the traction element 21 will be produced by the actuation of a mushroom button 33, in particular by its pressure, which will be connected to the lever system 32 at the non-pivoted end of the latter.

The connection between the traction element 21 and the transfer mechanism 15 will be such as to transform the linear traction movement of the first into the rotary movement of the pin 16.

The traction element 21 is also constantly placed in tension to always exert the above contrast solicitation.

Preferably, the traction element 21 may be provided with a voltage indicator which also allows the adjustment of the voltage.

For example, as more clearly visible from FIG. 4, the voltage indicator 34 is a cam element provided with a cylindrical body that will be made integral with the pin 16 to rotate coaxially therewith.

The indicator 34 will be inserted in a special seat of the housing 10 so that one of the faces of its cylindrical body is visible from the outside.

On this face there will be a reference mark 35, for example a trace, a notch or other distinctive element, which must be aligned with an arrow 36 or other reference mark present on the rear face of the housing 10.

The alignment between the reference element 35 and the arrow 36 will indicate the correct tensioning of the transfer mechanism 15.

Furthermore, the voltage can be finely adjusted by means of one or more registers. For example, a first register 37 could be arranged at the end of the traction element 21 close to the housing 10, while a second register 38 could be arranged at the end of the traction element 21 next to the driving element 30.

As long as the remote control device 14 exerts its contrast solicitation, cancelling the thrust of the elastic element 19, the release pin 16 will remain stationary in its inoperative position in which the axial projection 20 is not in contact with the slider 7 of the locking mechanism.

If an operator applies additional traction on the traction element 21, the elastic element 19 will undergo a further solicitation which will cause the release pin 16 to rotate around its axis and consequently cause the projection 20 to be pushed on the slider 7, which will translate downwards, freeing the retaining element 5 of the actuator device 3.

In the event that the traction element 21 is damaged or cut and will no longer be adapted to apply the contrast solicitation, the preloaded elastic element 19 will cause the release pin 16 to rotate in the opposite direction to the previous movement, however always causing the projection 20 to act on the slider 7, which in this case will also translate downwards, moving the sliding pin of the release mechanism and freeing the retaining element 5 of the actuator device 3.

The projection 20 of the release pin 16 may be shaped to act on the slider 7 following a rotation of 90° from both directions.

From FIGS. 11A, 11B, and 11C, it is also visible that the safety release 9 may be applied to the casing 4 of the switching device 2 according to different angular orientations, according to the positioning requirements of the remote control device 14 and/or of the switching device itself 2, significantly increasing the flexibility of application of the release 9 and of the switch associated therewith.

Preferably but not exclusively, the housing 10 may rotate around a central axis of the passage 11 wherein the pin 16 is inserted with a minimum rotation angle of 90° in both directions.

FIG. 12 shows a second embodiment of the safety release 9 which differs from the previous one essentially in that the connection between the traction element 21 and the release pin 16 is obtained by guide means 22 suitable for promoting translation of the pin 16 from the inoperative position to the operative position either following the application of an additional traction on the traction element 21 or in case the contrast solicitation is made null.

In this case, the preloaded elastic element is a linear spring 23 acting indirectly on the first end 17 of the pin 16, while the second end 18 may protrude to a lesser or greater extent according to its position.

In addition, the second end 18 of the pin 16 will be shaped as an inclined plane so that its contact with the upper end of the slider 7 will cause the latter to gradually slide downwards.

The operation of the safety release 9 is illustrated in FIGS. 15A, 15B, and 15C, wherein, from left to right, the release pin 16 is visible respectively in the condition in which it is not activated and is therefore in the inoperative position, in the condition in which is operated by means of the remote control device 14 and is therefore in a first operative position and finally in the condition in which the remote control device 14 no longer exerts the contrast solicitation, for example due to breakage or malfunction, with the consequence that the release pin 16 will always be moved into the operative position by means of the linear spring 23.

The translation movement will be produced by the effect of a guide element 24 connected to one end of the traction element 21 to be dragged by the same inside the housing 10 and against which the elastic element 23 will act.

The guide element 24 will be provided with a shaped guide track 25 in which the first end 17 of the pin 16 will slide and whose configuration will be such that the pin 16 always translates in the same direction, i.e. from the inoperative retracted position inside the housing 10 to the extracted operating position, either when the guide element 24 translates in a first direction due to the additional traction or when it translates in the opposite direction due to the thrust of the elastic element 23.

Also for this embodiment, the traction element 21 will have one end connected to the transfer mechanism 15 and the opposite end adapted to be fixed to an operating element 30, such as a knob, a mushroom or other element, anchored to a fixed support, in a technically equivalent manner to that described for the previous configuration; for example, the driving element 30 may be the same mushroom-shaped element described above.

Also for this configuration it is possible to provide for the presence of a voltage indicator, as well as for the fine adjustment registers of the traction element 21.

For example, the tension indicator could be the same translating guide element 24 showing on its external surface a drawn scale, having in the figure an ascending-descending profile, having the reference element 35 and which will be visible from the outside through a window 39 provided on the visible face of the housing 10, in correspondence with which the arrow 36 or other reference mark present on the rear face of the housing 10 will be provided.

Also in this case, the alignment between the reference element 35 and the arrow 36 will indicate the correct tensioning of the transfer mechanism 15.

FIG. 16 shows a third embodiment of the safety release 9 always applied to the same switching device 2 of the safety switch 1.

The safety release 9 differs from the previous ones first of all due to the fact that the remote control device 14 is of the oleodynamic, pneumatic or hydraulic type or may be operated by another type of fluid and comprises a pipe 26 adapted to send fluid under pressure on the movable pin 16.

As can be seen more clearly from FIGS. 18A and 18B, the movable pin 16 slides inside the housing 10 and is shaped to define thereinside a sealed chamber 27 designed to receive the pressurized fluid, also by means of suitable gaskets 28 placed around the pin 16.

In turn, the elastic element is defined by a linear operating spring 29 which acts on the first inner end 17 of the pin 16 to push it outwards.

When the release 9 is not activated, the pressure generated by the remote control device 14 will be as such as to counteract the stress produced by the spring 29, so as to keep the pin 16 in the inoperative retracted position wherein it is completely contained in the housing 10 or slightly protruding so as not to interact with the slider 7 of the locking mechanism.

To operate the pin 16 it will be sufficient to reduce or interrupt the contrast pressure so that the spring 29 pushes the pin 16 into the operative position.

Similarly, if there is a malfunction or breakage of the remote control device 14, the absence of pressure will cause the immediate actuation of the pin 16 due to the thrust of the spring 29.

The second end 18 of the pin 16 will be shaped as an inclined plane so that its contact with the upper end of the slider 7 causes it to slide progressively downwards.

Last but not least, also for this embodiment it will be possible to provide for the presence of voltage indicating means, not illustrated.

From above it is evident that the safety release and the switch according to the invention achieves the intended objects.

The release and the switch according to the invention are susceptible of numerous modifications and variations, all falling within the inventive concept expressed in the attached claims. All the details can be replaced by other technically equivalent elements, and the materials can be different according to the requirements, without departing from the scope of protection of the present invention.

The invention claimed is:

1. A remote safety release for a safety switch for access control, wherein the safety switch (1) comprises a casing (4) housing a locking mechanism, the remote safety release comprising:
   an actuator (13) adapted to interact with the locking mechanism of the associated switch (1) to cause its forced release, said actuator (13) being adapted to move between an inoperative position wherein it does not interact with the locking mechanism and at least one operative position wherein it interacts with the locking mechanism;
   a remote control device (14) adapted to be driven by an operator to remotely control said actuator (13) and promote the movement thereof from the inoperative position to an operative position for its interaction with the locking mechanism and the consequent release thereof; and
   a transfer mechanism (15) adapted to transfer a force from said remote control device (14) to said actuator (13) following a remote control command given by the operator to promote the movement of said actuator (13) from the inoperative position to an operative position;
   wherein said transfer mechanism (15) is adapted to exert a first solicitation with a respective value on said actuator (13) to promote its automatic passage from the inoperative position to an operative position, said remote control device (14) constantly exerting on said actuator (13), when said remote control command has not been given by the operator, a second contrast solicitation opposite to said first solicitation and having a value at least equal to the value of said first solicitation to cancel said first solicitation and hold said actuator (13) in said inoperative position, allowing the passage of said actuator (13) from the inoperative position to an operative position in the absence of said second solicitation for the release of the locking mechanism.

2. The remote safety release as claimed in claim 1, further comprising a housing (10) adapted to be anchored in a fixed manner to the casing (4) of the switch (1) and housing thereinside said actuator (13) and said transfer mechanism (15).

3. The remote safety release as claimed in claim 2, wherein said remote control device (14) comprises a tension indicator (24, 34) provided with a reference element (35) adapted to translate according to the value of said second solicitation to be aligned with a reference mark (36) present on said housing (10).

4. The remote safety release as claimed in claim 2, wherein said actuator (13) comprises an unlocking pin (16) movable in said housing (10) and having a first end (17) connected with said transfer mechanism (15) and a second end (18) adapted to project from said housing (10) at least when said unlocking pin (16) is in an operating position for interacting with the locking mechanism of the switch (1).

5. The remote safety release as claimed in claim 4, wherein said remote control device (14) is a hydraulic type, pneumatic type, oleo-dynamic type, or fluid dynamic type, and comprises a pipe (26) for sending fluid under pressure on said unlocking pin (16) for exerting said second contrast solicitation.

6. The remote safety release as claimed in claim 4, wherein said actuator (13) comprises an elastic element (19, 23, 29) preloaded with said first solicitation to constantly exert said first solicitation on said unlocking pin (16).

7. The remote safety release as claimed in claim 4, wherein said remote control device (14) comprises a traction element (21) having a first end connected to said transfer mechanism (15) and a second end opposite to the first end fixed to a driving element (30) connected to a fixed support (40), said traction element (21) constantly tensioned with said second contrast solicitation.

8. The remote safety release as claimed in claim 7, wherein said driving element (30) comprises a box-like body (31) to be fastened to said fixed support (40) and housing inside a lever (32) connected to one end of said traction element (21) and associated at an other end to a movable control element (33), suitable to cause a movement of said lever (32) and a consequent traction of said traction element (21), wherein the movable control element (33) is selected from the group consisting of: knobs, emergency buttons, buttons, and selectors.

9. The remote safety release as claimed in claim 7, wherein said unlocking pin (16) rotates around its central axis and has a second shaped end (18) provided with an axial projection (20) adapted to interact with the locking mechanism following the rotation of said unlocking pin (16) according to any direction, said preloaded elastic element (19) being a spiral spring.

10. The remote safety release as claimed in claim 7, wherein said preloaded elastic element (23) is a linear spring acting on said first end (17) of said unlocking pin (16), said transfer mechanism (15) comprising guiding means (22) adapted to move said unlocking pin (16) from said inoperative position to said operative position both when an additional traction is applied on said traction element (21) and when the value of said second contrast solicitation is null.

11. A safety switch for controlling access, comprising:
a switching device (2) having a casing (4) housing switching means of one or more circuits and anchored to a fixed part (F) of an access (A);
an actuator device (3) anchored to a movable part (M) of the access (A) to interact with said switching means when the access (A) is closed;
wherein said actuator device (3) comprises a retaining element (5) adapted to interact with said switch device casing (4) when the access (A) is closed to engage a locking mechanism present in said casing (4) and adapted to prevent said retaining element (5) to be removed from said casing (4);
wherein said switching device (2) is associated with a remote safety release (9) which comprises:
an actuator (13) adapted to interact with said locking mechanism to cause its forced release, said actuator (13) being adapted to move between an inoperative position wherein said actuator (13) does not interact with said locking mechanism and at least an operative position wherein said actuator (13) interacts with said locking mechanism;
a remote control device (14) adapted to be driven by an operator to remotely control said actuator (13) and move it from said inoperative position to said at least an operative position for said interaction with said locking mechanism and consequent release thereof;
a transfer mechanism (15) adapted to transfer a force from said remote control device (14) to said actuator (13) following a remote control command given by an operator to promote the movement of said actuator (13) from said inoperative position to an operative position;
wherein said transfer mechanism (15) is adapted to exert a first solicitation on said actuator (13) to promote passage thereof from said inoperative position to said at least an operative position, said remote control device (14) exerting on said actuator (13), when said remote control command has not been given by the operator, a second contrast solicitation opposite to said first solicitation and having at least equal value to cancel said first solicitation and hold said actuator (13) in said inoperative position, allowing passage of said actuator (13) from the inoperative position to said at least an operative position in an absence of said second solicitation for the release of the locking mechanism.

12. The safety switch as claimed in claim 11, wherein said casing (4) comprises a head (12) provided with at least one hole (6) for said retaining element (5) and a passage (11) for said actuator (13), said remote safety release (9) comprising a housing (10) anchored in a fixed manner to said casing (4) at said passage (11) and housing inside said actuator (13) and said transfer mechanism (15), said actuator (13) comprising an unlocking pin (16) movable in said housing (10) and having a first end (17) connected with said transfer mechanism (15) and a second end (18) adapted to project from said housing (10) to interact with said locking mechanism through said passage (11).

13. The safety switch as claimed in claim 12, wherein said housing (10) is rotatably anchored to said casing (4) to rotate around a central axis of said passage (11).

* * * * *